United States Patent [19]
Holmes et al.

[11] 3,792,919
[45] Feb. 19, 1974

[54] MOTION PICTURE FILM SYSTEM WITH MULTI-PURPOSE FILM CASSETTE

[75] Inventors: William A. Holmes, Marblehead; John R. Sharp, Squantum, both of Mass.

[73] Assignee: Polaroid Corporation, Cambridge, Mass.

[22] Filed: Jan. 3, 1972

[21] Appl. No.: 214,638

[52] U.S. Cl.............. 352/72, 352/78 R, 352/130, 352/202
[51] Int. Cl............................................ G03b 23/02
[58] Field of Search....... 352/72, 78, 130, 202, 146, 352/159; 353/57, 60, 61

[56] References Cited
UNITED STATES PATENTS

| | | | |
|---|---|---|---|
| 3,610,747 | 10/1971 | Bickel | 352/146 |
| 3,547,529 | 12/1970 | Anthes | 352/72 |
| 3,615,127 | 10/1971 | Land | 352/78 R |
| 2,423,562 | 7/1947 | Lee | 352/78 R |
| 3,514,194 | 5/1970 | Ariyasu et al. | 352/72 |
| 3,655,277 | 4/1972 | Land | 352/72 |
| 3,514,195 | 5/1970 | Nemeth | 352/78 R |

*Primary Examiner*—Joseph F. Peters, Jr.
*Assistant Examiner*—Alan Mathews

[57] ABSTRACT

A motion picture film handling cassette and a motion picture projector or viewer with which the cassette is adapted to be used for processing and projecting a photographic film strip stored within the cassette. The cassette includes a processing station for treating the film strip with a liquid processing composition and a projection station for locating a light-reflecting element in operative relation with the film strip for projection. Provisions are made for introducing air into the cassette near the projection station such that the air flows over at least a portion of the light-reflecting element for simultaneously cooling the light-reflecting element and heating the incoming air to enhance drying of the processed film strip.

42 Claims, 5 Drawing Figures

PATENTED FEB 19 1974 3,792,919

PATENTED FEB 19 1974

MOTION PICTURE FILM SYSTEM WITH MULTI-PURPOSE FILM CASSETTE

BACKGROUND OF THE INVENTION

1. Field of the Invention

This invention relates to the field of photography and, more particularly, to an improved motion picture film handling system featuring an air ventilated film handling cassette.

2. Description of the Prior Art

Self-developing motion picture film handling systems have recently been developed which feature a multi-purpose film handling cassette adapted for therebetween, with a motion picture camera and projector or viewer for exposing, processing, and projecting a length of photographic film strip without having to remove the film strip from the cassette.

The cassette comprises a housing for enclosing supply and take-up reels having a length of unexposed film strip coupled therebetwee, a combination exposure and projection station providing access to the film strip for exposure and projection, and a processing station fotreating a photo-sensitive emulsion on one side of the film strip with a liquid processing composition.

In operation, the cassette is mounted in the motion picture camera and the film strip is advanced from the supply reel through the exposure station, where it is subjected to image bearing light, and then onto the take-up reel. The cassette may then be transferred to a motion picture projector for processing and projection. During the initial rewind of the film strip from the take-up reel to the supply reel, it passes through the processing station and is coated with the liquid processing composition for developing latent images in the exposed photosensitive emulsion. Development takes place in a relatively short period of time so that almost immediately after rewind, the film strip may be advanced through the projection station for viewing. Exemplary of such new and unique systems are those described in U.S. Pat. No. 3,615,127 issued to Edwin H. Land on Oct. 26, 1971; U.S. Pat. No. 3,597,062 issued to Rogers B. Downey on Aug. 3, 1971; and U.S. Pat. No. 3,537,784 issued to Rogers B. Downey on Nov. 3, 1970; all of which are assigned to the same assignee as the present invention. Another self-developing motion picture film handling system which also includes an air ventilated film handling cassette is described in co-pending application Ser. No. 738,464, filed on June 20, 1968 by Edwin H. Land, now U.S. Pat. No. 3,655,277, issued Apr. 11, 1972.

The advantages of such a rapid film processing system are obvious. Time delays associated with sending the exposed film strip to a processing laboratory are eliminated. The photographer's desire to view the film strip shortly after it has been exposed is satisfied. Also, such systems are particularly useful in those commercial applications, such as television news reporting and scientific investigations, where time is of the essence.

Drying of the liquid treated film strip is facilitated by establishing a flow of air through the cassette housing during processing and/or projecting modes of operation. For this purpose, the cassette is provided with an air inlet for receiving air from a blower mounted in the projector and an air outlet. Generally, the film strip is wound onto the supply and take-up reels with the liquid coated emulsion side facing inwardly toward the reel hubs and only that portion of the film strip being transported between the reels is exposed to the drying influence of the air flowing through the cassette. In order to increase the efficiency of the drying process and reduce drying time, the blower may be equipped with a heater for raising the temperature of the incoming air.

Projection of the film strip at the combination exposure and projection station is facilitated by a light-reflecting element which is preferably permanently mounted in the cassette but may, in the alternative, be mounted in the projector. The light-reflecting element may take the form of a prismatic lens which is adapted to direct light from a high intensity projection lamp associated with the projector onto an incremental section of the film strip during the projection mode of operation.

For economic reasons, it is desirable to utilize a prismatic lens formed of a plastic material. However, since the lens is positioned in close proximity to the film strip and the high intensity liamp, it is preferable to cool the prism during the projection mode of operation to prevent lens distortion and excessive heat transfer to the film strip.

SUMMARY OF THE INVENTION

The present invention relates to improvements in a multi-purpose film handling cassette and a projector or viewer with which the cassette is adapted to be used.

Specifically, the cassette has been provided with means for establishing a path of travel for the film strip within the cassette housing such that the length of liquid coated emulsion exposed to the air flow through the housing is extended. Also, an air flow path has been established such that air may enter the cassette near the projection station and flow over at least a portion of the heated light-reflecting element thereby combining the function of cooling the light-reflecting element and heating the incoming air for reducing film drying time.

In previous cassette embodiments, the film strip has generally been stored on the supply and take-up reels with its photosensitive emulsion facing inwardly toward the reel hub. The present invention employs a "reverse wrap" film path such that the film strip is wound onto the reels with the emulsion side facing outwardly from the reel hubs thereby extending the length of emulsion exposed to the air flow by an amount approximating the length of the reel circumference.

In conjunction with locating the air inlet at a position near the cassette projection station, a location for the air outlet is provided such that it is positioned on the opposite side of the supply and take-up reels from the air inlet for promoting a smooth and efficient flow of air over the outwardly facing coated emulsion. Advantageously, the location of the air outlet also promotes the efficient discharge of air from the projector since the outlet is adapted to be aligned with an access slot in the projector housing when the cassette is located in its operative position within the projector.

Therefore, it is a primary object of the present invention to provide a multi-purpose film handling cassette of the type previously described wherein air flowing through the cassette housing is utilized to cool an optical element and dry a processed film strip.

It is another object of the present invention to provide a multi-purpose film handling cassette of the type including a housing, a projection station including a light-reflecting element, and an air inlet in the housing positioned adjacent the projection station such that incoming air flows over at least a portion of the light-reflecting element for cooling the light-reflecting element and for heating the air.

It is yet another object of the present invention to provide a multi-purpose film handling cassette, of the type wherein a photographic film strip is adapted to be processed by coating one side thereof with a liquid processing composition, which includes means for establishing a film path within the cassette housing such that the film strip is wound on reels therein with the coated side facing outwardly to extend the length of coated film strip exposed to air flowing through the cassette housing.

Another object of the present invention is to provide an improved motion picture projector for use in connection with the multi-purpose film handling cassette of the type indicated.

It is yet another object of the present invention to provide a method for operating the multi-purpose film handling cassette in conjunction with a film projector or viewer.

Other objects of the invention will in part be obvious and will in part appear hereinafter.

BRIEF DESCRIPTION OF THE DRAWINGS

For a fuller understanding of the nature and objects of the invention, reference should be had to the following detailed description taken in connection with the accompanying drawings wherein.

DESCRIPTION OF THE PREFERRED EMBODIMENT

Figure 1:
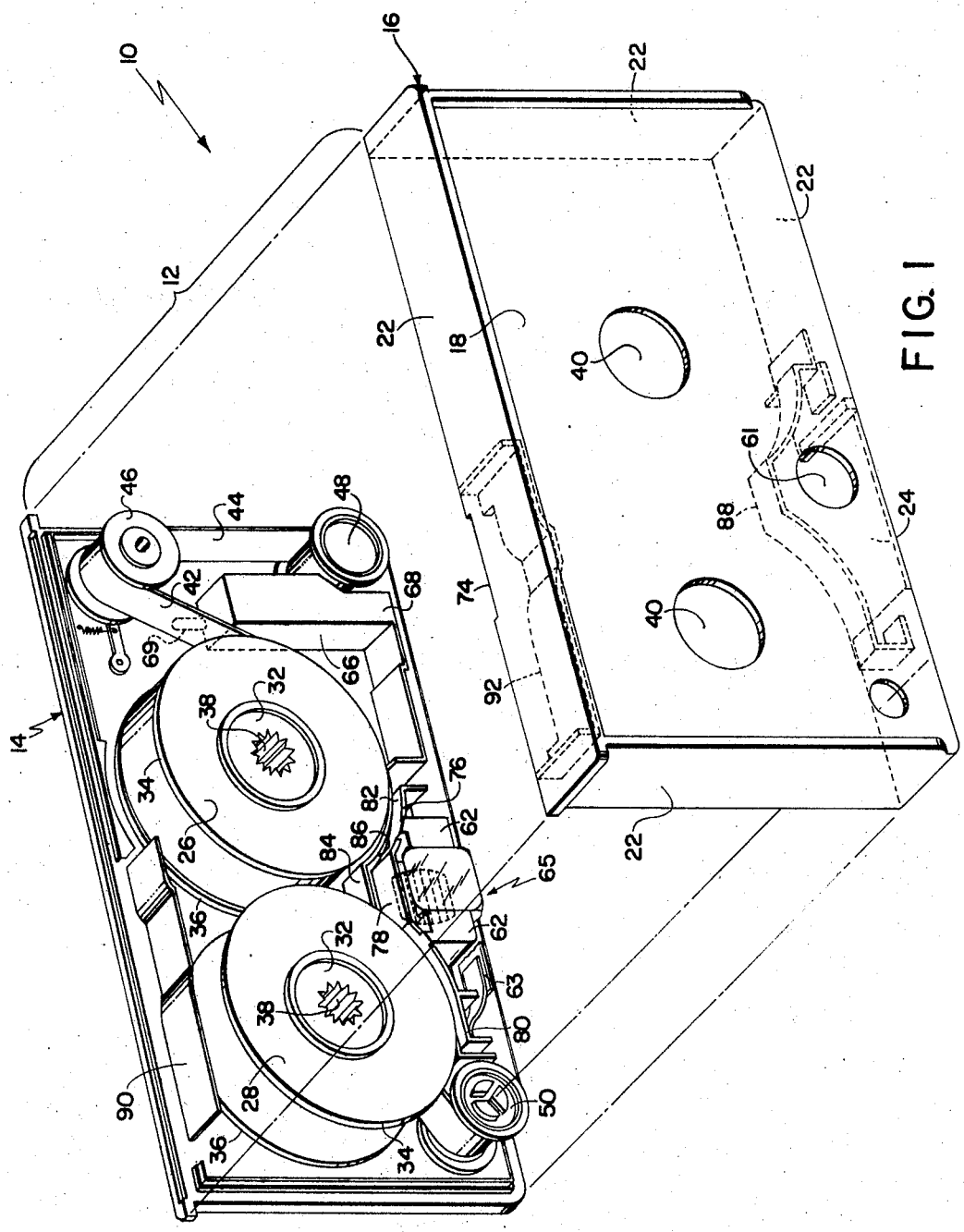
FIG. 1 is an exploded perspective view of a multi-purpose film handling cassette embodying the instant invention showing the arrangement of its component parts within the cassette housing.

A preferred embodiment of this invention is illustrated as applying a compatible processing fluid to a film structure which comprises both a photosensitive image recording layer and an image receiving layer in which a visible image may be formed by image forming substances transferred by diffusion from the photosensitive layer without necessitating the subsequent removal of the processed photo-sensitive layer. This highly desirable type of film structure is made possible by a developed negative image having low covering power.

In typical silver halide diffusion transfer-reversal processes for the production of black and white images, a silver halide developer and a silver halide solvent are applied in an aqueous alkaline solution to a photo exposed silver halide stratum or emulsion where they develop exposed silver halide to silver and react with unreduced silver halide to form a soluble silver complex. This complex, in order to form a positive print, is transferred and reduced to silver on a silver receptive stratum on which the silver halide stratum has been superposed. It has generally been the practice, in the completion of this process, to separate the silver receptive and silver halide strata in order to render the postive image visible, particularly, when it is to be viewed in transmitted light.

However, as indicated above, the positive print may be rendered visible without separation of the silver halide and silver receptive strata. For example, the silver receptive stratum may be so constituted as to provide an unusually vigorous silver precipitating environment which causes the silver to deposit upon it, in comparison with silver developed in the silver halide stratum, to possess very high covering power, i.e., opacity for a given mass of reduced silver. If the silver halide is in such a concentration as to give rise when fully developed only to a predetermined low maximum density, and if the silver complex is reduced to silver in a vigorous silver precipitating environment, the resulting negative and positive images in superposition provide a composite that presents a good positive image for projection purposes as long as the images are carried on a light-transmitting support. Since the silver halide stratum and the silver receptive stratum need not be separated, a simplification of the overall silver halide diffusion transfer-reversal process is achieved.

A composite film assembly of this type as well as processing compositions for producing a stable black and white image which can be viewed by transmitting light without the necessity of removing the processed, negative image containing photosensitive layer are shown in prior U.S. Pat. No. 2,861,885 of Edwin H. Land which issued on Nov. 25, 1958. Other composite film assemblies capable of producing photographic records which can be exhibited in full color without the necessity of removing the processed photosensitive layer as shown in prior U.S. Pat. of Edwin H. Land, No. 2,726,154, issued Dec. 6, 1955 and No. 2,944,894, issued July 12, 1960. All of these prior patents are assigned to the same assignee of the present invention.

However, it should be noted that the present invention is not directed to the chemistry by which visible images are formed in an exposed photosensitive material and/or formed in an image receiving stratum associated therewith. While an illustrative preferred embodiment of the invention is shown applying a compatible processing fluid to a film structure not requiring the removal of the photosensitive layer after visible image formation is completed, the invention itself is also applicable for use with other types of processing fluids and film structures.

Figure 3:
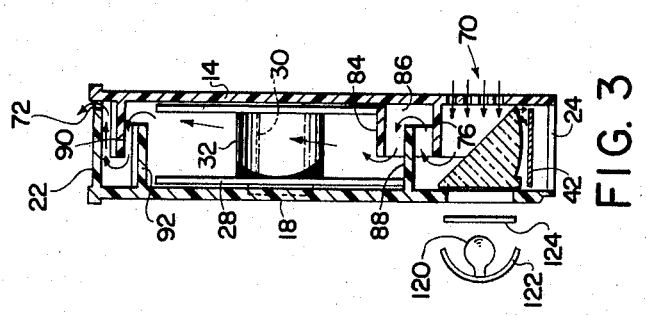
FIG. 3 is a section of the multi-purpose film handling cassette shown in FIG. 2 taken along lines 3—3 showing the air flow path through the cassette housing.
Figure 2:
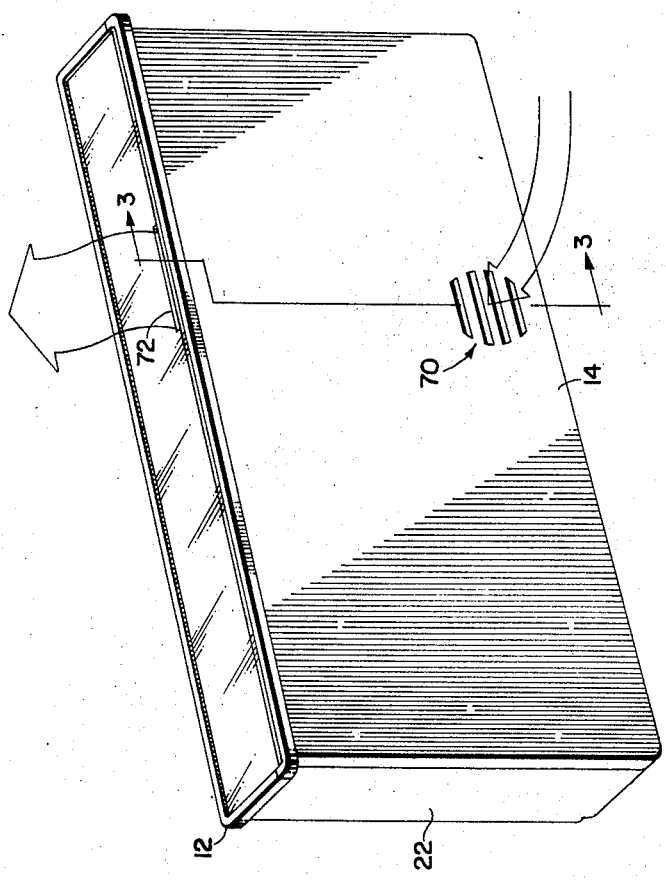
FIG. 2 is a perspective view of the cassette shown in FIG. 1 illustrating the location of an air inlet and air outlet in the cassette housing.

Referring now to FIGS. 1, 2, and 3 of the drawings, a multi-purpose film handling cassette is generally shown at 10. Cassette 10 includes a substantially rectangular parallellepiped shaped housing 12 formed of any suitable opaque material, for example, a thermoplastic such as polystyrene. As best shown in FIG. 1, housing 12 includes a generally rectangular base section or side wall 14 for supporting various cassette components and a mating cover 16 for enclosing those components. Cover 16 includes a generally rectangular side wall 18 and an integrally formed peripheral wall 22 which serves to space side walls 14 and 18 in parallel relation to one another. A generally rectangular opening 24 is provided in peripheral wall 22 and serves as a film gate for providing access to the film strip during exposure and projection modes of operation. Thus, cassette 10 is provided with means for providing access for image carrying light rays to an incremental section of the film strip to facilitate film exposure operations and means for providing access for light rays from an externally mounted projection lamp to be directed through an incremental section of the film strip to facilitate film projection operations.

A supply reel 26 and a take-up reel 28 are rotably mounted on a pair of axles 30 (only one of which is shown in FIG. 3) integrally formed with side wall 14 and disposed such that reels 26 and 28 may be located in side by side coplanar relation with their respective axes of rotation substantially normal to side walls 14 and 18. Reeels 26 and 28 are of the conventional type and include a central hub section 32 for receiving axle 30, top and bottom guide flanges 34 and 36 extending radially from hub section 32, and a central recess 38 accessible through holes 40 in cover 16 for receiving appropriate reel drive shafts mounted in both a motion picture camera and projector.

Coupled between the hub sections 32 of reels 26 and 28 is a length of unexposed photographic film strip 42 having conventional sprocket holes 43 disposed adjacent one edge thereof. Film strip 42 is of the type previously described having a photosensitive emulsion 44 on one side thereof. Initially, the major portion of film strip 42 is stored on supply reel 26 with its photosensitive emulsion side 44 facing outwardly away from hub section 32.

The means for establishing a path of travel for film strip 42 between supply reel 26 and take-up reel 28 include guide rollers or idlers 46, 48, and 50. These three idlers are rotably mounted on axles (not shown) such that their respective axes of rotation are substantially normal to side walls 14 and 18. As best shown in FIG. 1, idlers 46, 48, and 50 are disposed proximate three successive corners of housing 12 with idlers 46 and 48 occupying the first two successive corners, respectively, intermediate supply reel 26 and opening 24, and idler 50 occupying the next successive corner intermediate opening 24 and take-up reel 28.

It will be noted that the film path from supply reel 26 to idler 46 crosses a line joining the axis of rotation of supply reel 26 and idler 46 such that film strip 42 passes around idler 46 with its photosensitive emulsion side 44 facing inwardly toward idler 46. Likewise, film strip 42 also passes around idlers 48 and 50 with emulsion side 44 facing inwardly such that the film strip 42 is presented at opening 24 with its emulsion side 44 facing inwardly toward the interior of housing 12. Preferably, during the transport of the film strip from supply reel 26 to the take-up reel 28, the take-up reel is driven in a counterclockwise (as seen in FIG. 1) direction which causes film strip 42 to be stored on the take-up reel 28 with its emulsion side 44 facing outwardly from hub section 32.

Figure 5:
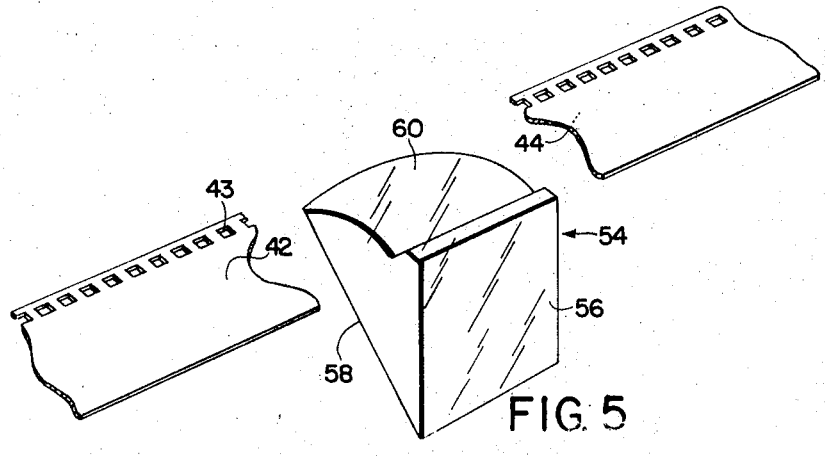
FIG. 5 is a perspective view of a light-reflecting prismatic lens associated with the multi-purpose film handling cassette and a portion of a film strip.

To facilitate projection of film strip 46 at the opening 24, cassette 10 is provided with a light-reflection optical element which in the preferred embodiment may take the form of a molded plastic prismatic lens 54. As best shown in FIG. 5, prismatic lens 54 includes a substantially flat, transparent, light-receiving surface 56 and a flat reflecting surface 58 which reflects light, transmitted into lens 54 through surface 56, outwardly to a convex transparent surface 60 onto that portion of film strip 42 positioned at opening 24. A prismatic lens of this type suitable for use in connection with the present invention is described in copending application Ser. No. 214,591, filed on even date herewith by Philip G. Baker and assigned to the same assignee as the present invention.

As best seen in FIG. 1, prismatic lens 54 is adapted to be mounted on side wall 14 intermediate idlers 48 and 50 such that surface 60 is in alignment with opening 24 and surface 56 is in alignment with an aperture 61 in cover 16. In the preferred embodiment, a pair of lens support members 62 are integrally formed with side wall 14 and are suitably shaped to support lens 54 in its operative position shown in FIGS. 1 and 3 wherein lens 54 and opening 24 cooperate to form a combination exposure and projection station 65. During exposure and projection modes of operation, film strip 42 is transported between lens surface 60 and opening 24. A spring biased film pressure plate 63 is provided at station 65 which is adapted to cooperate with an aperture plate in the camera and projector for accurately locating film strip 42 with respect to station 65.

As noted earlier, subsequent to the exposure of film strip 42, the emulsion side 44 is adapted to be coated with a liquid processing composition for developing latent images therein by a diffusion transfer process. For this purpose, cassette 10 is provided with a normally inoperative processing station formed by a processing fluid dispenser 66 supported by side wall 14 with its lower applicator end 68 located adjacent the path of travel of emulsion side 44 intermediate opening 24 and idler 48. Dispenser 66 includes a container having therein a supply of viscous developing fluid. The lower applicator end 68 includes an orifice which acts as a nozzle for feeding a doctor blade to supply a carefully measured thickness of the viscous film processing fluid to the emulsion side 44 of film strip 42. A rupturable membrane may be provided across the orifice to render the dispenser inoperative. Dispenser 66 also includes a plunger 69 which is operable to apply pressure to the fluid within the container during the processing mode of operation. The pressure causes the membrane to rupture thereby permitting the fluid to flow through the orifice and across the doctor blade for appliction to the film strip as it is transported past the doctor blade during its initial rewind onto supply reel 26. Such a processing system is described in U.S. Pat. No. 3,615,127.

The processing fluid is somewhat volatile and tends to dry very quickly due to evaporation. However, to insure complete and rapid drying, it is preferable to ventilate housing 12 and establish an air flow path therethrough to accelerate the evaporation process. As best shown in FIG. 2 cassette 10 is provided with an air inlet 70 in side wall 14 and an air outlet 72 in peripheral wall 22.

Air inlet 70 may be formed by a series of elongated slots disposed proximate the cassette processing station 65 formed by prismatic lens 54 and opening 24. The slots are located behind lens 54 and between the pair of lens mount members 62 such that incoming air is directed at the exterior of prism light-reflecting surface 58 (See FIG. 3).

Air outlet 72 is formed by a generally rectangular recess 74 in peripheral wall 22 on the opposite side of cassette 10 from the film gate 24 which is adapted to cooperate with the mating edge of the side wall 14 for forming the elongated air outlet slot 72.

To protect film strip 40 from being fogged by actinic light which may enter cassette housing 12 through the air inlet 70, air outlet 72, prismatic lens 54, or opening 24, the cassette is provided with a series of blade-like baffles which are configured to cooperate for forming light-blocking and air distribution labyrinths.

As best shown in FIG. 1, a first elongated baffle 76 is integrally formed with side walls 14 and includes a central portion 78 coupled between and cooperating with lens mounting members 62 to form an interior wall surrounding three sides of air inlet 70. Baffle 76 further includes a second section 80 extending outwardly from section 78 towards idler 50 and a third section 82 extending outwardly from the opposite side of section 78 toward idler 48. Located between baffle 76 and the supply and take-up reels 26 and 28 is a second baffle 84 integrally formed with side wall 14. It will be noted that baffle 84 is spaced from baffle 76 to form an elongated channel 86 therebetween.

A third baffle 88 is integrally formed with cover side wall 18 and peripheral wall 22 adjacent opening 24 and is shaped to extend downwardly from side wall 18 into the channel 86 between baffle 76 and 84 when cover 16 is operatively positioned over side wall 18. As best shown in FIG. 3, the blade-like baffle 76, 84, and 88 are shorter than peripheral wall 22 such that they cooperate to form a labyrinth path therebetween.

Air entering housing 12 through inlet 70 is initially contained and directed by the interior wall formed by lens mount member 62 and baffle section 78 such that the air flow is directed at the exterior of prism reflecting surface 58. Surface 58 is located in a plane which forms an acute angle with side wall 14 and baffle 76 and serves as a deflector for directing incoming air towards baffles 76, 84, and 88. The air flows into channel 86, under the lower edge of baffle 88, and up over the top edge of baffle 84 into the interior of housing section 12. It will be noted that the cooperating baffles tend to distribute the air outwardly from the processing station to promote a more uniform distribution within housing 12.

A similar light-blocking baffle system is provided on the opposite side of reels 26 and 28 for directing the air out of housing 12 through air outlet 72. This exit system includes a fourth elongated blade-like baffle 90 integrally formed with side wall 14 and a fifth baffle 92 integrally formed with side wall 18 and that portion of peripheral wall 22 containing recess 74. As best shown in FIG. 3, baffle 90 extends upwardly between baffle 92 and peripheral wall 22 such that they cooperate to form a lightsealing and air-directing laybrinth path therebetween.

Cassette 10, as earlier noted, is adapted to be mounted in a motion picture camera for exposing the film strip 42 by incrementally advancing the film strip past opening 24 where it is exposed to image bearing light from the camera lens. During the exposure mode of operation, substantially the entire length of film strip 42 is transferred from supply reel 26 to the take-up reel 28.

Figure 4:
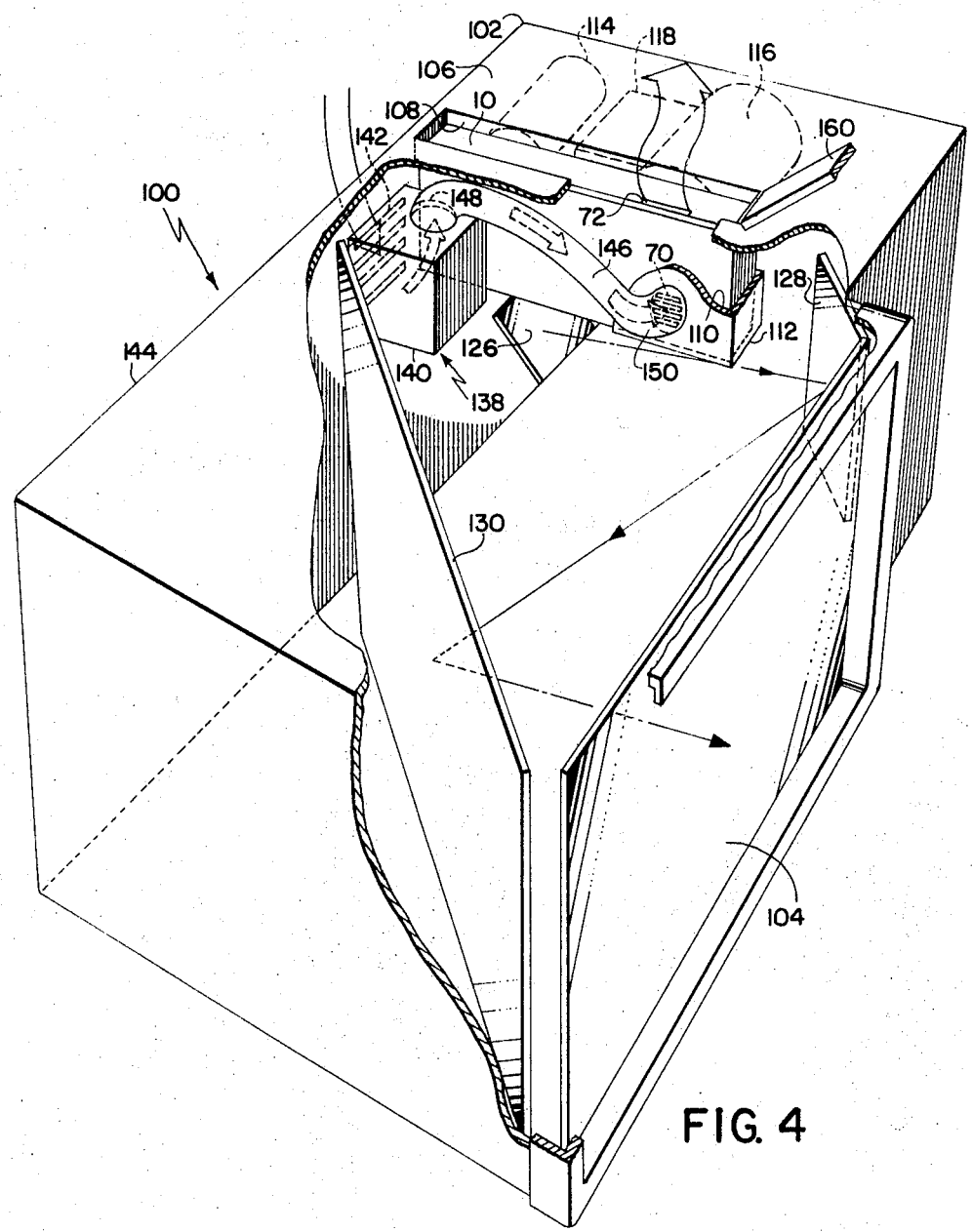
FIG. 4 is a perspective view, partly in section, of a motion picture viewer having a multi-purpose film handling cassette operatively positioned therein.

After exposure, the cassette 10 may be transferred to a motion picture projector or viewer configured to process film strip 42 and thereafter project it for viewing. Referring now to FIG. 4, a motion picture viewer suitable for use with cassette 10 is shown generally at 100.

Viewer 100 includes a box-like housing 102 formed in part by a rear projection screen 104. It will be understood that while viewer 100 includes a self-contained projection screen, cassette 10 is also suitable for use with the more conventional type of motion picture projector which is adapted to project images onto a remote viewing screen.

Located in a top wall 106 of housing 102 is an elongated rectangular access slot 108 communicating with a substantially parallelepiped shaped opened ended chamber 110 located benneath top wall 106 for receiving and supporting cassette 10 at an operative position within viewer 100. Cassette 10 is adapted to be inserted through access slot 108 with the opening 24 facing a bottom wall 112 of chamber 110 such that when the cassette is fully inserted into chamber 110, air outlet 72 faces access slot 108 for discharging air there-through to the exterior of viewer housing 102.

It will be noted that in the embodiment shown in FIG. 4, that portion of peripheral wall 22 containing air outlet 72 is positioned below the top wall 106 of viewer housing 102. In other embodiments, the air outlet may be flush with wall 106 or raised slightly above it. The important concept is to position the air outlet 72 in close proximity to an exterior wall of the viewer housing 102 for establishing an air flow path from the air outlet 72 to the exterior of the viewer housing.

Viewer 100 is provided with reel drive mechanisms 114 and 116 which include motors, slip clutches, and appropriate drive shafts adapted to extend through openings 40 in cassette side wall 18 and engage recesses 38 in the reel hub section 32 of supply reel 26 and take-up reel 28.

Intermediate drive mechanisms 114 and 116 is a projection lamp housing 118 having therein a suitable high intensity lamp 120 (See FIG. 3), a reflector 122 for directing light from lamp 120 through aperture 61 in cassette side wall 18 toward the light receiving surface 56 of prismatic lens 54, and a heat absorbing filter 124 positioned between lamp 120 and prismatic lens 54 for reducing heat transfer therebetween.

Aligned with opening 24 are suitable projection means (not shown) including a projector lens, an appropriate rotary shutter, and a conventional claw mechanism for engaging sprocket holes 43 in film strip 42 for incrementally advancing film strip 42 between opening 24 and prismatic lens 54 during the projection mode of operation.

Positioned below the projector lens is a mirror 126 which is adapted to cooperate with mirrors 128 and 130 for establishing a folded optical path from the projector lens to the rear of projection screen 104. However, it is within the context of the present invention to utilize cassette 10 with other embodiments of the viewer such as the one disclosed in the copending application of Edwin H. Land, Ser. No. 174,375, filed on Aug. 24, 1971, in which a single mirror is utilized to establish an optical path from the projector lens to a tilted rear projector screen.

An air blower 138 is provided within viewer housing 102 and includes a main blower housing 140 communicating with the exterior of housing 102 via air inlets 142 formed in an exterior side wall 144 of the viewer housing and further includes an air transmission duct 146 having one end 148 thereof communicating with blower housing 140 and the opposite end 150 thereof disposed to be operatively associated with cassette air inlet 70 when cassette 10 is fully inserted into receiving chamber 108. It will be understood that blower 138 also includes a conventional motorized fan located in blower housing 140 which is not shown in the drawings to more clearly illustrate the intake air flow path from the exterior of housing 102 to the cassette air inlet 70.

In operation, cassette 10 is mounted in a motion picture camera and the film strip 42 therein is exposed. Then the cassette 10 is transferred to viewer 100 and is inserted through access slot 108 into its operative position within chamber 110 as shown in FIG. 4. The processing composition dispenser 66 is actuated by an actuating pin mounted in viewer 100 (not shown) which depresses the plunger 69 to release the fluid and cause it to flow across the doctor blade; the blower 138 is turned on to initiate a flow of air through cassette housing 12. Viewer 100 and cassette 10 are now configured to initiate the processing mode of operation.

Supply reel 26 is driven in a clockwise direction (as viewed in FIG. 1) for transporting film strip 42 past the lower applicator end 68 of dispenser 66 where a thin uniform coating of processing fluid is applied to emulsion side 44. A pressure pad (not shown) is provided on the opposite side of film strip 42 for holding emulsion side 44 against the applicator.

Air supplied to air inlet by duct 146 is deflected by the exterior of prism reflecting surface 58 through the light blocking labyrinth path established by cooperating baffles 76, 84, and 88 into the interior of housing 12 such that the air flows between and around supply reel 26 to take-up reel 28 generally flooding the entire interior of housing section 12 with air. During the initial rewind, the air flow has some drying effect on that portion of the coated film strip between idlers 46 and 48, but for the most part, the large percentage of film drying occurs between idler 46 and the supply reel 26. As successive layers of film strip are wound onto supply reel 26, the length of outwardly facing coated emulsion progressively increases. The placement of the air outlet 72 on the opposite side of the reels from the air inlet 70 effectively establishes an air flow path across the reel such that drying is enhanced along the entire circumference of the reels.

Film strip 42 is preferably rewound onto supply reel 26 at a fairly rapid rate when compared to the normal exposure and projection rates of 18 frames per second, and therefore the drying process may be only partially completed during the processing mode of operation.

Since development of the latent images is accomplished in a fairly short period of time, film strip 42 may be transported through projection station 65 for projection almost immediately after the completion of the processing mode of operation.

During the projection mode of operation, projection lamp 120 is turned on; the claw mechanism is activated for transporting the film strip 42 past opening 24; and take-up reel drive system 116 is activated to wind the advancing film strip onto take-up reel 28. Those skilled in the art will recognize that idler 46 may be configured to be resiliently mounted for movement downwardly toward dispenser 66 in response to the claw mechanism moving the film strip 44 toward the projection position at opening 24, thereafter moving back to the position shown in FIG. 1 to regulate the tension in the film strip for preventing tearing of the sprocket holes 43 by the claw mechanism. Likewise, idler 50 may be configured to be engaged by a mechanism within the projector such that its rotation may be selectively arrested for providing "snubbing action."

Notwithstanding heat absorbing filter 124, a significant amount of heat is transferred from projection lamp 120 to the prismatic lens 54 during the projection mode of operation. As best shown in FIG. 3, air inlet 70 positioned behind lens 54 directs the incoming air such that it flows over the exterior of the lens reflecting surface 58 befre being deflected toward baffle 76, 84 and 88 for cooling the prism and heating the incoming air flow.

The drying effect on film strip 42 during the first projection run is enhanced because; the film strip 42 is being transported at a slower rate during the projection mode of operation than during the rewind operation; the air is heated during the projection run; and an additional length of the coated emulsion, namely that portion between film gate 24 and take-up reel 28; is exposed to the heated air flow. As noted earlier, take-up reel 28 is adapted to be driven in a counterclockwise direction (as viewed in FIG. 1) such that the film strip 42 is wound thereon with emulsion side 44 facing outwardly from its hub section causing the length of exposed coated emulsion to progressively increase as successive layers of film strip are wound onto take-up reel 28.

n addition to cooling prismatic lens 54, provisions may be made for cooling that portion of film strip 42 located at opening 24 and the heat-absorbing filter 124 positioned between projector lamp 120 and the prismatic lens light-receiving surface 56. This may be accomplished by configuring the prismatic lens mounting members 62 or prismatic lens 54 scuh that a small portion of the incoming air flows between the prismatic lens 54 and the mounting members 62 for cooling the film strip at opening 24. Also the prismatic lens light-reflecting surface 56 may be spaced from the interior surface of cassette side wall 18 thereby permitting a small portion of the incoming air to flow out through aperture 61 in side wall 18 for cooling the heat-absorbing filter 124.

As best seen in FIG. 4, air outlet 72 faces the access slot 108 when cassette 10 is operatively positioned in viewer 100 for directing air from the cassette out of the viewer housing 102 therethrough. It may be desirable to provide a cover 160 for access slot 108 for aesthetic purposes or for protecting the viewer components located adjacent receiving chamber 110. Such a cover 160 may be ventilated or configured to be loose fitting such that it does not interfere with the efficient discharge of the air from viewer housing 102.

In summary, there has been disclosed an improved ventilated film handling cassette and an improved projector or viewer with which the film handling cassette is adapted to be used. The cassette features an air inlet positioned near a projection station such that incoming air may cool a prismatic lens and in turn be heated thereby. An air outlet is provided on the opposite side of supply and take-up reels from the air inlet for promoting an air flow across the reels to enhance drying of a film strip. Advantageously, the size of the cassette is minimized by employing only three guide rollers which establish a path of travel for the film strip through the cassette housing such that the film strip is wound on supply and take-up reels with its coated emulsion side facing outwardly to extend the length of emulsion exposed to the air flow. An air blower is provided in the viewer and is disposed to be operatively associated with the cassette's uniquely located air inlet when the cassette is located at its operative position. The cassette air outlet is aligned with an access slot of the viewer for establishing a discharge air flow path from the cassette outlet to the exterior of the viewer housing.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A film handling cassette for use with a motion picture projector or viewer of the type including a projector housing, means defining an access slot in the projector housing through which said cassette is adapted to be inserted to locate said cassette at an operative position within the projector housing, and an air blower within the projector housing for blowing air through said cassette, said cassette comprising:

a cassette housing dimensioned to pass through the access slot in the projector housing, said cassette housing including a peripheral wall aligned with the access slot and facing the exterior of the projector housing when said cassette is located at its operative position within the projector housing;

means defining an air inlet in said cassette housing, said inlet being disposed to communicate with the air blower when said cassette is located at its operative position within the projector housing for receiving air from the air blower and directing it into said cassette housing; and means defining an air outlet in said peripheral cassette housing wall aligned with the access slot for directing air out of said cassette housing such that it may be discharged from the projector housing to the exterior thereof.

2. A film handling cassette as defined in claim 1 further including means for locating a light-reflecting element proximate said air inlet, said light-reflecting element being adapted to be heated during a projection mode of operation and the air entering said cassette through said air inlet being directed to flow over at least a portion of said light-reflecting element for cooling said light-reflecting element.

3. A film handling cassette as defined in claim 2 wherein said light-reflecting element is permanently mounted in said cassette housing.

4. A film handling cassette as defined in claim 1 further including a photographic film strip stored within said housing, said film strip being adapted to be coated with a liquid processing composition and thereafter dried by the air flowing through said housing.

5. A film handling cassette as defined in claim 4 wherein said film strip is stored on reels within said cassette housing and said air inlet and said air outlet are disposed on opposite sides of said reels for establishing an air flow path therebetween across said reels.

6. A film handling cassette as defined in claim 1 wherein said peripheral cassette housing wall having said air outlet therein faces said access slot when said cassette is located at its operative position within the projector housing and said air outlet directs air to the exterior of the projector housing through the access slot.

7. A film handling cassette for use with a motion picture projector or viewer of the type including a projector housing, means defining an access slot in the projector housing through which said cassette is adapted to be inserted to locate said cassete at an operative position within the projector housing, and an air blower within the projector housing for blowing air through said cassette, said cassette comprising:

a cassette housing dimensioned to pass through the access slot in the projector housing, said cassette housing including one wall aligned with the access slot and facing the exterior of the projector housing when said cassette is located at its operative position within the projector housing;

means defining an air inlet in said cassette housing, said inlet being disposed to communicate with the air blower when said cassette is located at its operative position for receiving air from the air blower and directing it into said cassette housing;

means defining an air outlet in said one cassette housing wall aligned with the access slot for directing air out of said cassette housing such that it may be discharged from the projector housing to the exterior thereof;

a photographic film strip stored within said housing, said film strip being adapted to be coated with a liquid processing composition and thereafter dried by the air flowing through said housing; and means defining light blocking and air distributing labyrinths adjacent said air inlet and air outlet for protecting said film strip stored within said cassette housing from actinic light and for directing air from said inlet into said housing and directing air out of said housing through said air outlet.

8. A film handling cassette for use with a motion picture projector or viewer of the type including a projector housing, means defining an access slot in the projector housing through which said cassette is adapted to be inserted to locate said cassette at an operative position within the projector housing, and an air blower within the projector housing for blowing air through said cassette, said cassette comprising:

a cassette housing dimensioned to pass through the access slot in the projector housing, said cassette housing including one wall aligned with the access slot and facing the exterior of the projector housing when said cassette is located at its operative position within the projector housing;

means defining an air inlet in said cassette housing, said inlet being disposed to communicate with the air blower when said cassette is located at its operative position for receiving air from the air blower and directing it into said cassette housing;

means defining an air outlet in said one cassette housing wall aligned with the access slot for directing air out of said cassette housing such that it may be discharged from the projector housing to the exterior thereof;

a photographic film strip stored within said housing, said film strip being adapted to be coated with a liquid processing composition and thereafter dried by the air flowing through said housing; and a light-reflecting element mounted in said cassette housing proximate said air inlet such that air entering said cassette housing through said inlet flows over at least a portion of said light-reflecting element and is deflected thereby toward the interior of said cassette housing.

9. A film handling cassette as defined in claim 8 wherein said light-reflecting element is heated by a projection lamp during a projection mode of operation and is cooled by said air entering said cassette through said air inlet.

10. A film handling cassette as defined in claim 9 wherein said air flowing over at least a portion of said light-reflecting element is heated thereby during said projection mode of operation to enhance drying of said film strip stored within said cassette housing.

11. A film handling cassette for use with a motion picture projector or viewer of the type including an air blower for blowing air through said cassette and a projecting lamp for providing light to be directed through an incremental section of a film strip stored within said cassette, the film strip being adapted to be treated with a liquid processing composition prior to projection and the air serving to facilitate drying of the film strip, said cassette comprising:
a housing;
means defining a projection station for locating a light-reflecting element in operative relation with an incremental section of the film strip and the projection lamp when said cassette is operatively positioned within the projector such that the light-reflecting element directs light from the projection lamp through the incremental section for projection and is heated by the projection lamp;
means defining an air inlet in said housing proximate said projection station for receiving air from the air blower when said cassette is operatively positioned within the projector and for directing the air such that it flows over at least a portion of the light-reflecting element for cooling the light-reflecting element;
means defining an air outlet in said housing through which air may be discharged therefrom;
said air inlet and said air outlet being positioned on opposite sides of the film strip stored within said cassette for establishing an air flow path therebetween across the film strip; and
a first light blocking and air distributing labyrinth intermediate said air inlet and the film strip.

12. A film handling cassette as defined in claim 11 further including means establishing a second light blocking and air distributing labyrinth intermediate the film strip and said air outlet.

13. A film handling cassette for use with a motion picture projector or viewer of the type including an air blower for blowing air through said cassette and a projection lamp for providing light to be directed through an incremental section of a film strip stored within said cassette, said cassette comprising:
a housing;
means defining a projection station including a light-reflecting element permanently mounted in said housing for locating said light-reflecting element in operative relation with an incremental section of the film strip and the projection lamp when said cassette is operatively positioned within the projector such that said light-reflecting element directs light from the projection lamp through the incremental section for projection and is heated by the projection lamp;
means defining an air inlet in said housing proximate said projection station for receiving air from the air blower when said cassette is operatively positioned within the projector and for directing the air such that it flows over at least a portion of said light-reflecting element for cooling said light-reflecting element; and
means defining an air outlet in said housing through which air may be discharged therefrom;
said light-reflecting element including a prismatic lens including a surface disposed adjacent said air inlet for deflecting air from said inlet towards the interior of said housing.

14. A film handling cassette comprising:
a substantially parallelepiped shaped housing including a pair of side walls spaced in parallel relation by a peripheral wall;
a supply reel and take-up reel rotably mounted within said housing in coplanar relation with their respective axes of rotation substantially normal to said pair of side walls;
a length of photographic film strip including a photosensitive emulsion on one side thereof coupled at one end to said supply reel and coupled at the opposite end to said takeup reel;
means for providing access at said peripheral wall for light rays from an externally mounted projection lamp to be directed through an incremental section of said film strip to facilitate film projection operations;
means for establishing a path of travel for said film strip within said housing past said access means including first, second, and third rotably mounted idler means disposed proximate three successive corners of said housing such that said first and second idler means are disposed intermediate said supply reel and said access means with said first idler means being intermediate said supply reel and said second idler means and said third idler means is disposed intermediate said access means and said take-up reel, said film strip being operatively associated with said reels and idler means such that it may be wound on at least said supply reel with said one side facing outwardly therefrom and pass around said first, second, and third idler means with said one side facing inwardly toward said first, second, and third idler means;
a processing station where said one side of said film strip may be treated with a liquid processing composition prior to projection operations;
means defining an air inlet in one of said side walls proximate said access means for introducing air into said housing to enhance drying of a treated film strip; and
means defining an air outlet in said peripheral wall opposite said access means through which air may be discharged from said housing, said air inlet and outlet being disposed on opposite sides of said supply and take-up reels for establishing an air flow path therebetween across said supply and take-up reels.

15. A film handling cassette comprising:
A substantially parallelepiped shaped housing including a pair of side walls spaced in parallel relation by a peripheral wall;
a supply reel and take-up reel rotably mounted within said housing in coplanar relation with their respective axes of rotation substantially normal to said pair of side walls;

a length of photographic film strip including a photosensitive emulsion on one side thereof coupled at one end to said supply reel and coupled at the opposite end to said take-up reel;

means for providing access at said peripheral wall for light rays from an externally mounted projection lamp to be directed through an incremental section of said film strip to facilitate film projection operations;

means for establishing a path of travel for said film strip within said housing past said access means including first, second, and third rotably mounted idler means disposed proximate three successive corners of said housing such that said first and second idler means are disposed intermediate said supply reel and said access means with said first idler means being intermediate said supply reel and said second idler means and said third idler means is disposed intermediate said access means and said take-up reel, said film strip being operatively associated with said reels and idler means such that it may be wound on at least said supply reel with said one side facing outwardly therefrom and pass around said first, second, and third idler means with said one side facing inwardly toward said first, second, and third idler means;

a processing station where said one side of said film strip may be treated with a liquid processing composition prior to projection operations;

means defining an air inlet in one of said side walls proximate said access means for introducing air into said housing to enhance drying of a treated film strip; and means defining a first light-blocking and air distributing labyrinth intermediate said air inlet and said supply and take-up reels for projecting said film strip from actinic light and directing air from said air inlet between and around said supply and take-up reels.

16. A film handling cassette as defined in claim 15 further including a prismatic lens positioned between said air inlet and said access means, said prismatic lens including a surface disposed for deflecting air entering said cassette housing through said air inlet towards said first labyrinth.

17. A film handling cassette as defined in claim 16 wherein said prismatic lens is heated during a projection mode of operation and said air entering said cassette housing through said air inlet is adapted to flow over at least a portion of said prismatic lens for cooling said prismatic lens.

18. A film handling cassette as defined in claim 17 wherein said prismatic lens is configured such that a portion of the air entering said cassette through said inlet may flow around said prismatic lens for cooling an incremental section of said film strip operatively associated with said lens for projection.

19. A film handling cassette as defined in claim 18 wherein said prismatic lens is configured such that another portion of the air entering said cassette through said air inlet may flow around said prismatic lens and be directed towards the externally mounted projection lamp for cooling a heat absorbing filter associated therewith.

20. A film handling cassette as defined in claim 15 further including means defining a second light-blocking and air distributing labyrinth intermediate said supply and take-up reels and said air outlet for protecting said film strip from actinic light and directing air out of said cassette housing through said air outlet.

21. A film handling cassette adapted to be mounted in a motion picture projector or viewer of the type including an air blower for facilitating film projection and processing operations, said cassette comprising:

a housing;

supply and take-up reels mounted within said housing;

a length of photographic film strip including a photosensitive emulsion on one side thereof coupled at one end to said supply reel and coupled at the opposite end to said take-up reel;

a processing station for treating said one side of said film strip with a liquid processing composition;

a projection station past which said film strip is adapted to be transported for projection subsequent to being treated with said liquid processing composition;

means defining an air inlet proximate said projection station in said housing for directing air from the blower into said housing to enhance drying of said film strip;

means for establishing a path of travel for said film strip through said housing such that said film strip may be wound on at least one of said supply and take-up reels with said one side facing outwardly therefrom for extending the length of said one side of said film strip exposed to air flowing within said housing; and means defining an air outlet in said housing through which air may be discharged therefrom;

said projection station being formed in part by a light-reflecting element which is heated during a projection mode of operation, said light-reflecting element being operatively associated with said air inlet such that incoming air flows over at least a portion of said light-reflecting element for cooling said light-reflecting element.

22. A film handling cassette as defined in claim 21 wherein said incoming air is heated by said light-reflecting element and is deflected by said light-reflecting element toward said supply and take-up reels.

23. A film handling cassette for use with a motion picture projector or viewer of the type including an air blower for blowing air through said cassette and a projection lamp for providing light to be directed through an incremental section of a film strip stored within said cassette, the film strip being adapted to be treated with a liquid processing composition prior to projection, said cassette comprising:

a housing;

means defining a projection station for locating a light-reflecting element in operative relation with an incremental section of the film strip and the projection lamp when said cassette is operatively positioned within the projector such that the light-reflecting element directs light from the projection lamp through the incremental section for projection and is heated by the projection lamp;

means defining an air inlet in said housing proximate said projection station for receiving air from the air blower when said cassette is operatively positioned within the projector and for directing the air such that it flows over at least a portion of the light-reflecting element for cooling the light-reflecting element; and means defining an air outlet in said housing through which air may be discharged therefrom, said air inlet and said air outlet being positioned on opposite sides of the film strip stored within said cassette for establishing an air flow path therebetween across the film strip to enhance drying of the liquid treated film strip.

24. A film handling cassette as defined in claim 23 wherein the light-reflecting element is permanently mounted in said cassette to form part of said projection station.

25. A film handling cassette comprising:

a substantially parallelepiped shaped housing including a pair of side walls spaced in parallel relation by a peripheral wall;

a supply reel and take-up reel rotably mounted within said housing in coplanar relation with their respective axes of rotation substantially normal to said pair of side walls;

a length of photographic film strip including a photosensitive emulsion on one side thereof coupled at one end to said supply reel and coupled at the opposite end to said take-up reel;

means for providing acess at said peripheral wall for light rays from an externally mounted projection lamp to be directed through an incremental section of said film strip to facilitate film projection operations;

a processing station for treating said one side of said film strip with a liquid processing composition prior to projection;

means for establishing a path of travel for said film strip within said housing past said access means including first, second, and third rotably mounted idler means disposed proximate three successive corners of said housing such that said first and second idler means are disposed intermediate said supply reel and said access means with said first idler means being intermediate said supply reel and said second idler means and said third idler means is disposed intermediate said access means and said take-up reel, said film strip being operatively associated with said reels and idler means such that it may be wound on at least said supply reel with said one side facing outwardly therefrom and pass around said first, second, and third idler means with said one side facing inwardly toward said first, second, and third idler means; and means defining an air inlet in one of said side wall proximate said access means for introducing air into said housing to enhance drying of a liquid treated film strip.

26. A film handling cassette as defined in claim 25 wherein said film strip is operatively associated with said supply and take-up reels and said first, second and third idler means such that said film strip may be wound onto both of said supply and take-up reels with said one side facing outwardly therefrom.

27. a motion picture projector or viewer for use with a film handling cassette of the type including a cassette housing, a photographic film strip stored within the cassette housing, a projection station including means for locating a light-reflecting element in operative relation with an incremental section of said film strip for projection, means defining an air inlet proximate the projection station, and means defining an air outlet, said motion picture projector comprising:

a projector housing;

means within said projector housing for supporting the cassette at an operative position within said projector;

projection means disposed to cooperate with the projection station when the cassette is located at its operative position, said projection means including a source of light adapted to be operatively associated with the light-reflecting element thereby causing the light-reflecting element to be heated;

an air blower disposed to be operatively associated with the cassette air inlet when the cassette is located at its operative position for blowing air into the cassette to cool the light-reflecting element; and means defining an access slot in said projector housing through which the cassette is adapted to be inserted and means defining an open ended chamber communicating with said access slot for receiving and supporting the cassette in its operative position, said chamber being configured such that when the cassette is fully inserted therein the cassette air outlet is aligned with said access slot and faces the exterior of said projector housing.

28. A motion picture projector as defined in claim 27 wherein said access slot is formed in an exterior wall of said projector and the air inlet is located below said exterior wall when the cassette is located at its operative position for directing air from the cassette to the exterior of said projector housing through said access slot.

29. A film handling cassette adapted to be mounted in a motion picture projector or viewer of the type including an air blower for facilitating film projection and processing operations, said cassette comprising:

a housing;

supply and take-up reels mounted within said housing;

a length of photographic film strip including a photosensitive emulsion on one side thereof coupled at one end to said supply reel and coupled at the opposite end to said take-up reel;

a processing station for treating said one side of said film strip with a liquid processing composition;

a projection station past which said film strip is adapted to be transported for projection subsequent to being treated with said liquid processing composition;

means defining an air inlet in said housing for directing air from the blower into said housing to enhance drying of said film strip;

means for establishing a path of travel for said film strip through said housing such that said film strip may be wound on at least one of said supply and take-up reels with said one side facing outwardly therefrom for exposure to air flowing within said housing; and means defining an air outlet in said housing through which air may be discharged therefrom.

30. A film handling cassette as defined in claim 29 wherein said means for establishing a path of travel for said film strip through said housing are configured such that said film strip may be wound on both said supply reel and said take-up reel with said one side facing outwardly therefrom.

31. A film handling cassette as defined in claim 29 wherein said air inlet is disposed proximate said projection station.

32. A motion picture film handling system comprising:
- a film handling cassette including;
  - a cassette housing;
  - a length of photographic film strips stored within said cassette housing;
  - a projection station where incremental sections of said film strip may be progressively advanced past a light-reflecting element for projection;
  - a processing station for treating said film strip with a liquid processing composition;
  - means defining an air inlet in said cassette housing proximate said projection station through which air may be introduced into said cassette housing; and
  - means defining an air outlet in said housing through which air may be discharged therefrom;
- in combination with a projector comprising;
  - a projector housing having an access slot therein through which said cassette is adapted to be inserted to locate said cassette at an operative position witin said projector housing wherein said air outlet is aligned within said access slot and faces the exterior of said projector housing;
  - an air blower disposed such that it is operatively associated with said cassette air inlet when said cassette is located at its operative position within said projector housing for blowing air through said cassette housing to enhance drying of a processed film strip; and
  - projection means adapted to be operatively associated with said projection station for projecting said film strip, said projection means including a source of light adapted to be operatively associated with said light-reflecting element;
- said source of light causing said light-reflecting element to be heated during a projection mode of operation, said air entering said cassette proximate said projection station being directed to flow over at least a portion of said light-reflecting element for cooling said light-reflecting element and heating said air, said heated air being directed into said cassette for drying said film strip and thereafter being directed out of said cassette housing through said air outlet to the exterior of said projector housing.

33. A motion picture film handling system as defined in claim 32 wherein said photographic film strip is stored on supply and take-up reels within said cassette housing and said air inelt and said air outlet are disposed on opposite sides of said reels for establishing an air flow path therebtween across said reels.

34. A motion picture film handling system as defined in claim 33 further including a first light-blocking and air distributing labyrinth intermediate said air inlet and said reels and a second light-blocking and air distributing labyrinth intermediate said reels and said air outlet.

35. A motion picture film handling system as defined in claim 33 wherein said film strip is adapted to be treated by having said liquid processing composition coated on one side thereof and said film strip is adapted to be wound on at least one of said supply and take-up reels with said one side facing outwardly therefrom for extending the length of coated film strip exposed to the flow of air through said cassette housing.

36. A film handling system as defined in claim 35 wherein said film strip is adapted to be wound onto both said supply and take-up reels with said one side facing outwardly therefrom.

37. A method of operating a film handling cassette of the type including a housing, a photographic film strip having a photosensitive emulsion on one side thereof stored within said housing, a normally inoperative processing station for treating said photosensitive emulsion with a liquid processing composition, and a projection station wherein a light-reflecting element may be positioned in operative relation with an incremental section of said film strip for projection, said method comprising the steps of:
- rendering said normally inoperative processing station operative;
- progressively transporting said film strip past said operative processing station for treating said photosensitive emulsion with said liquid processing composition;
- illuminating said light-reflecting element for projecting said film strip thereby causing said light-reflecting element to be heated;
- progressively transporting said liquid treated film strip past said projection station for projecting incremental sections thereof progressively located in operative relation with said illuminated light-reflection element; and
- directing air through said housing simultaneously as said film strip is progressively transported into operative relation with said illuminated light-reflecting element such that the air flows over at least a portion of said heated light-reflecting element for cooling said light-reflecting element thereby causing the air to be heated and then flow into contact with liquid treated portions of said film strip to enhance the drying thereof.

38. The method as defined in claim 37 further including the step of storing said film strip on supply and take-up reels within said housing with said film strip wound on at least one of said supply and take-up reels with said one side thereof facing outwardly therefrom for extending the length of liquid treated photosensitive emulsion exposed to the air flow through said housing.

39. The method as defined in claim 37 further including the step of storing said film strip on supply and take-up reels within said housing with said film strip wound on both of said supply and take-up reels with said one side facing outwardly therefrom for extending the length of liquid treated photosensitive emulsion exposed to air flow through said housing.

40. The method of claim 37 further including the step of deflecting the heated air with said light-reflecting element to cause the heated air to flow into contact liquid treated portions of said film strip.

41. The method of claim 37 further including the step of light sealing the air flow path through said housing to prevent exposure of said film strip stored therein.

42. The method of claim 37 further including the step of blowing air through said housing simultaneously with the step of progressively transporting said film strip past said operative processing station to enhance drying of said liquid treated film strip.

* * * * *